March 9, 1943.  C. J. KROW  2,313,247
TIRE PRESSURE INDICATING MEANS
Filed May 21, 1941  4 Sheets-Sheet 1
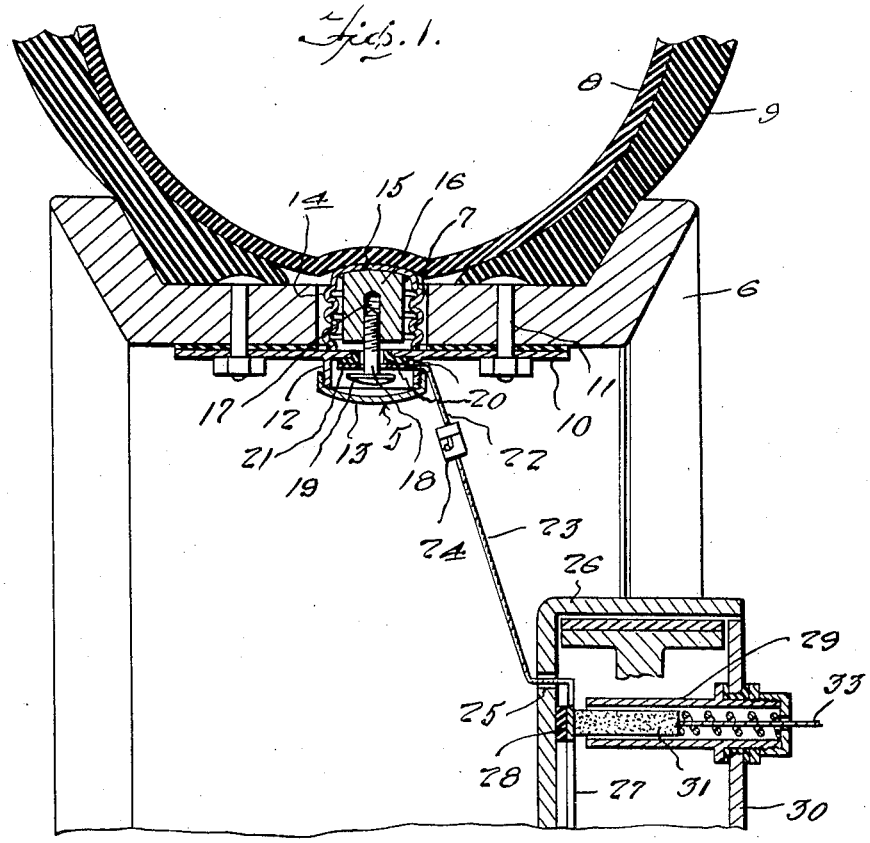
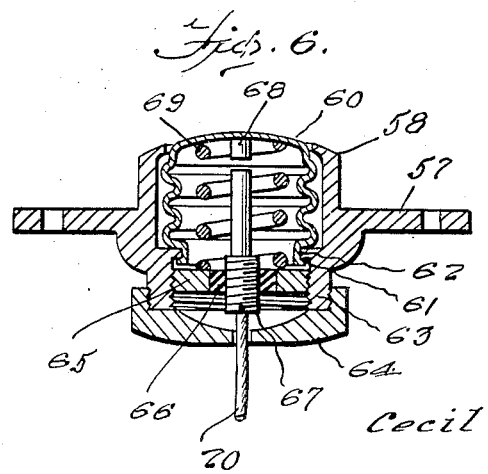
Inventor
Cecil J. Krow.
By
Harness, Dickey & Pierce.
Attorneys

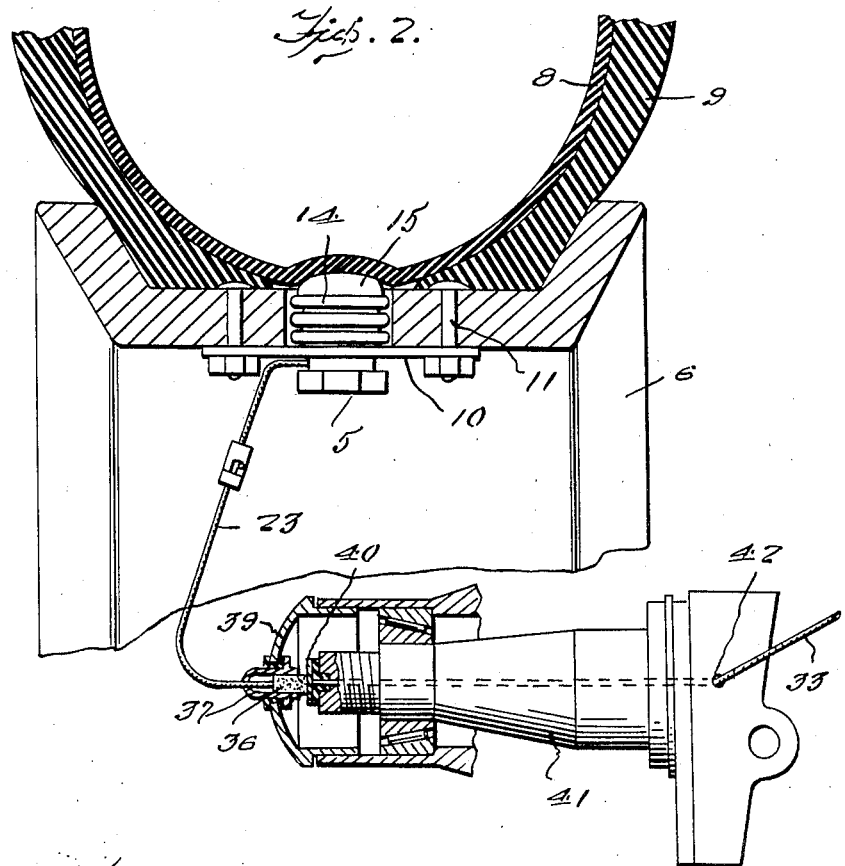
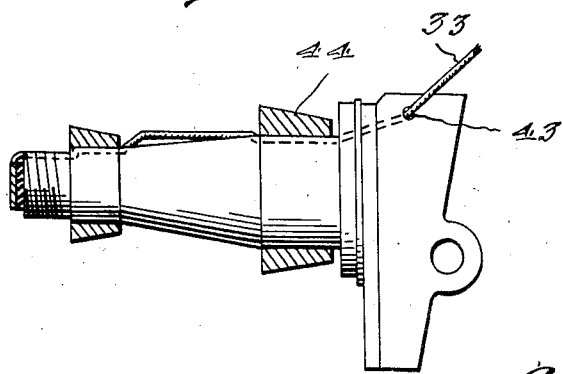
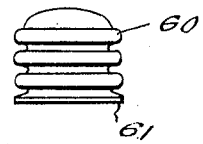

March 9, 1943.  C. J. KROW  2,313,247
TIRE PRESSURE INDICATING MEANS
Filed May 21, 1941  4 Sheets-Sheet 3
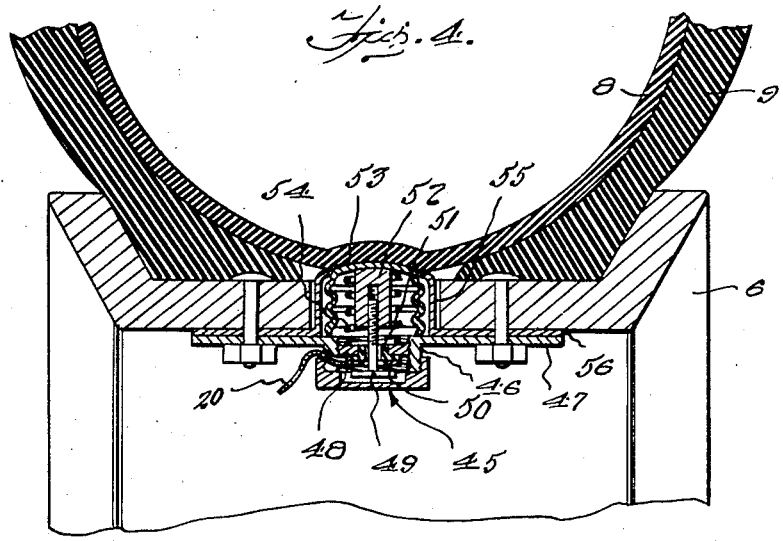
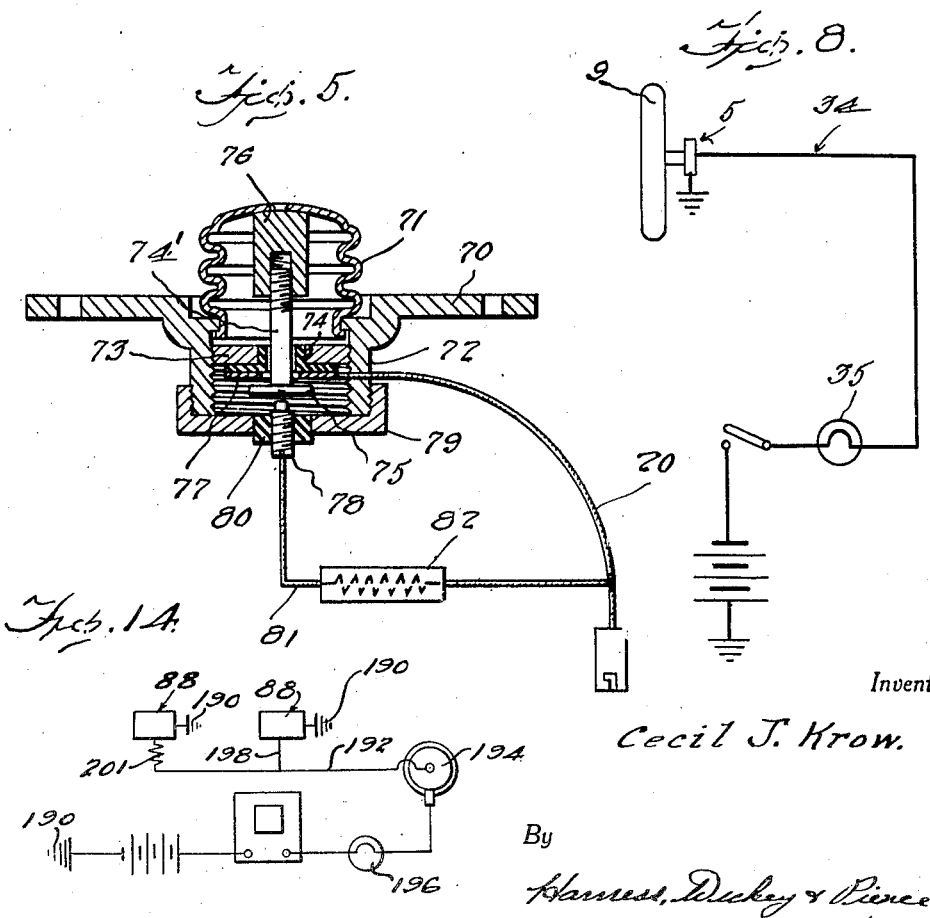
Inventor
Cecil J. Krow.
By
Harness, Dickey & Pierce.
Attorneys

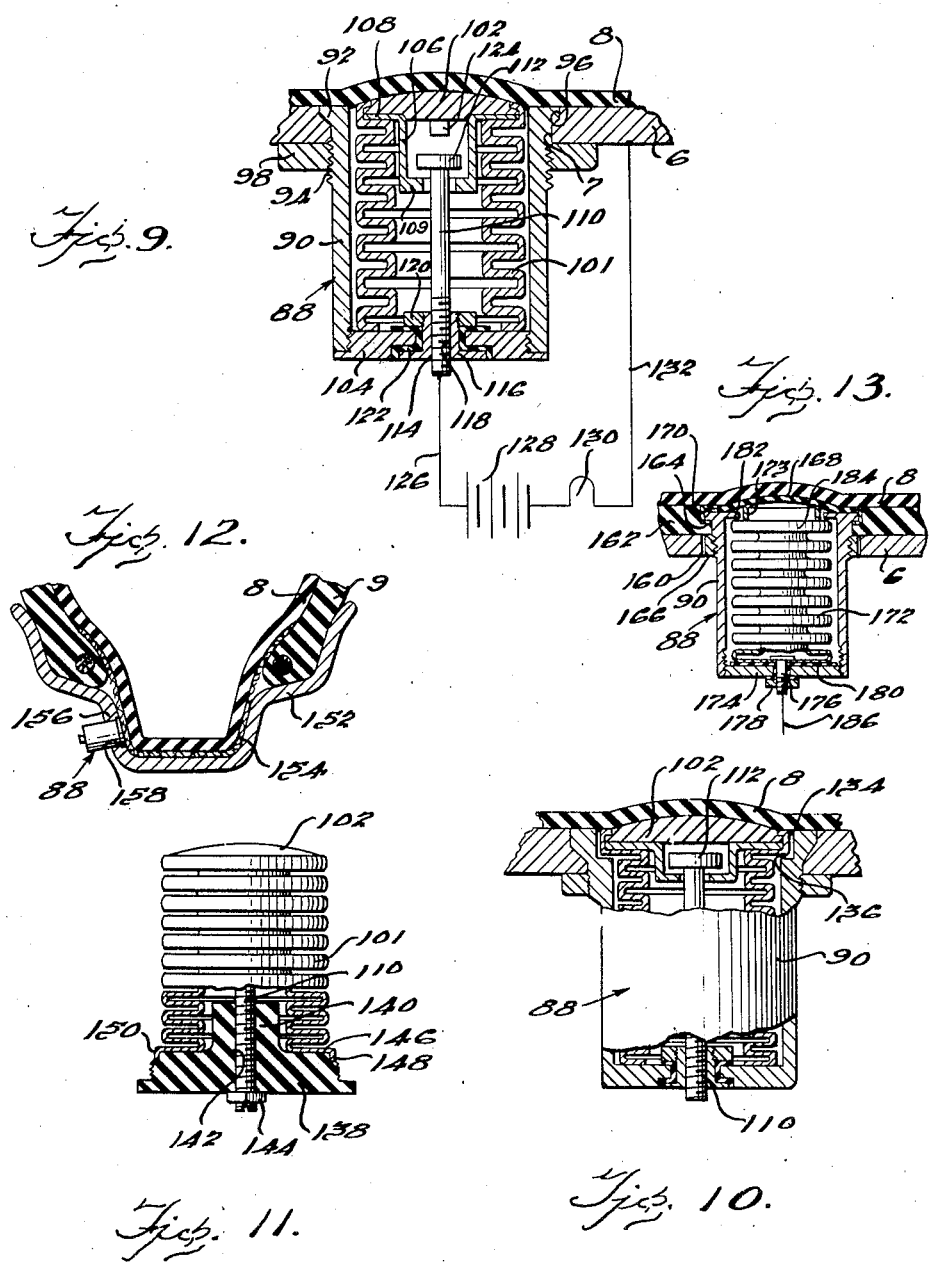

Patented Mar. 9, 1943

2,313,247

UNITED STATES PATENT OFFICE 2,313,247

TIRE PRESSURE INDICATING MEANS

Cecil J. Krow, Ralston, Okla.

Application May 21, 1941, Serial No. 394,479

8 Claims. (Cl. 200—58)

The present invention relates to means for indicating pressure conditions in pneumatic tires and the present application is a continuation in part of the co-pending application of Cecil J. Krow, Serial No. 302,240, filed October 31, 1939.

One of the primary objects of the present invention is to provide a highly efficient indicator of this general type that is economical to manufacture and which will indicate both over and under inflation of pneumatic tires.

Another important object of the present invention is to provide a device of the type mentioned which may be readily secured in position as a unit and which is so constructed that the contacts are sealed, thereby protecting the contact surfaces from foreign matter such as dirt and moisture.

Another object of the invention is to provide a device of the type mentioned in which an expansible sleeve means is mounted to operate in full floating position, thus eliminating frictional surfaces which would corrode or stick and make false readings of the pressure conditions in the tire.

Another object of the invention is to provide a novel construction of circuit closer which is operable by fluid or air pressure conditions and which has means for adjusting the switch so that its response to such pressure actuations may be regulated and controlled.

Another object of the invention is to provide a construction by which the operable parts may be readily replaced.

Another object of the invention is to provide a sensitive pressure indicator of the type mentioned which is automatically operable to attract the attention or otherwise warn the driver when the tire pressure is above and/or below the proper pressure.

Another object of the invention is to provide a device of the type mentioned which may be readily applied to a tired wheel and which will not interfere with the tire should it be necessary to remove the latter from the wheel for repairs or replacement.

Another object of the invention is to provide a device of the type mentioned which is not affected by centrifugal action, particularly at extremely high speeds.

Another object of the invention is to provide a device of the type mentioned which is adapted for use on dual wheel constructions and which indicates the pressure conditions in either wheel.

Other objects of the invention will become apparent from the following specification, the drawings relating thereto, and from the claims hereinafter set forth.

In the drawings, in which like numerals are used to designate like parts in the several views throughout:

Figure 1 is a fragmentary, transverse, sectional view of a portion of a wheel and pneumatic tire illustrating one embodiment of the present invention;

Fig. 2 is a view similar to Fig. 1 showing a modified means of completing the circuit through the axle of the automobile;

Fig. 3 is an enlarged, side elevational view, with parts in section, illustrating the axle with a part of the present invention adapted thereto;

Fig. 4 is a view similar to Fig. 1 illustrating a modified form of the present invention;

Fig. 5 is a vertical, sectional view illustrating another modified form of the pressure indicating means of the present invention;

Fig. 6 is a view generally similar to Fig. 5 and illustrating another modified form of the present invention;

Fig. 7 is a side elevational view illustrating the bellows which form part of the present invention;

Fig. 8 is a diagrammatic view showing a wiring diagram in which any of the forms of the present invention may be employed for the control thereof;

Fig. 9 is a view similar to Fig. 1 illustrating another modified form of the present invention;

Fig. 10 is a view generally similar to Fig. 9 with a portion of the housing shown in elevation and illustrating a modified form of the present invention;

Fig. 11 is a side elevational view with parts in section of a portion of the structure shown in Fig. 9 and illustrating a modified form thereof;

Fig. 12 is a vertical, sectional view of a drop-center rim type of wheel having a device of the present invention associated therewith;

Fig. 13 is a view generally similar to Fig. 9 of a modified form of the present invention; and Fig. 14 is a diagrammatic view of a system employing the present invention on dual wheels.

Referring to the drawings and referring particularly to Fig. 1 thereof, in which one embodiment of the present invention is illustrated, a conventional metal rimmed vehicle wheel is shown at 6 having a conventional pneumatic tire 9 and inner tube 8 mounted thereon in the usual way. An opening 7 is provided through the rim or wheel 6 and is adapted to receive therethrough a pressure responsive means, according to the present invention, which is generally indicated at 5. The pressure responsive means 5 comprises an attaching plate 10 secured to the rim 6 by fasteners 11. Such plate 10 is provided with an opening therethrough which is surrounded by an externally screw-threaded neck 12 to receive a removable closure cap 13 for the purpose of excluding dirt and other foreign material. The neck 12 is located on the exterior face of the attaching plate 10 while the opposite face thereof has secured thereto a bellows type sleeve 14. Such sleeve 14 has a closed rounded end 15 which is adapted to project through the opening 7 when the unit is applied to the wheel and be engaged by the inner tube 8. In this form of the invention, the bellows type sleeve may have its open end soldered or otherwise secured on the attaching plate 10. It is to be understood that the sleeve 14 is of the expansible type and is contracted by the pressure of the air in the inner tube 8.

A block-like member 16 is located in the sleeve 14 and has one end thereof secured on the end wall 15. Such member 16 is provided with a screw-threaded opening or socket 17 to receive the screw-threaded end of a movable and adjustable electric contact 18. Such contact 18 includes a contact head 19 which is movable and operable within the neck 12. The movable contact extends through the opening in the attaching plate 10 and is insulated from the latter by an insulating collar 20 arranged in the opening of the plate 10 and provided with a flange forming a seat and attaching medium for a relatively fixed electrical contact 21.

An electrical conductor 22 is connected to the contact 21 and extends through an opening provided in the neck 12 to be connected to a conductor 23 by a detachable coupling 24. A conductor 23 extends through an opening 25 in the brake drum 26 of the wheel and connects with an annular contact 27 which is mounted on and insulated from the drum, as shown at 28.

A tubular casing 29 is detachably mounted on and insulated from a dust plate 30. Such casing 29 has a spring influenced contact brush 31 normally urged into contact with the annular member 27. The brush 31 has an electrical conductor 32 connected thereto which forms a part of a conventional electric circuit 34, as shown in Fig. 8, and which includes an electric alarm 35.

Under normal inflation of the tire 9, the expansion of the bellows type sleeve 14 is resisted by the air pressure within the tube 8 so that the head 19 of the contact 17 will be spaced from the contact 21, thereby leaving the circuit to the alarm 35 open. However, should the air pressure fall below a predetermined amount, from any cause, the bellows type sleeve will expand and automatically make contact between the contacts 19 and 21, thereby completing the circuit of the alarm and consequently directing attention to the fact that the tire is losing air pressure below the predetermined desired amount.

Referring to Fig. 2, a modified manner of connecting the electric circuit elements is shown. Instead of employing the rotatable type of circuit closure employed in the brake drum 26 of the wheel 6, the conductor 23 may be connected to a contact brush 36 mounted in a sleeve 37 over the wheel hub cap 38, as shown in Fig. 2. In this instance, the sleeve 37 is suitably insulated from the cap. The contact brush 36 rides against a contact 40 which is mounted on and insulated from the end of an axle spindle 41. The axle spindle has an axially disposed passage 42 formed therein through which the conductor wire 33 of the electric circuit may pass for connection to the contact 40.

As shown in Fig. 3, the axle spindle may have the conductor passage 43 thereof partly in the form of grooves which open outwardly between the wheel bearing 44 on the spindle, and the conductor wire 33 may extend out of the grooves between the wheel bearings.

In the pressure responsive means generally indicated at 5, the movable contact 18 thereof may be adjusted relative to the contact 21 by threading the stem of the contact 18 into and out of the block-like member 16 which will permit this device to be readily adjusted for use on tires which have different amounts of air pressure. Ready access may be had to the member 18 for making such adjustment merely by removing the cap 13.

Referring to Fig. 4 in which another modified form of the present invention is indicated, a pressure responsive means is generally indicated at 45 in which the neck 46 of the attaching plate 47 has threaded therein a contact supporting plug 48 which is apertured to slidably receive a movable contact 49 and supports a contact 50 to which the conductor wire 29 is connected. A flange sleeve 51 insulates the contact 49 from the plug 48 and also insulates the contact 50 from the plug 48. The contact 49 is threaded into the plug-like member 52 which is secured to the closed end of the bellows-like sleeve 53. The sleeve 53 is suitably secured to the attaching plate 47.

An expansible coil spring 54 is interposed between the closed end of the sleeve 53 and the contact supporting plug 48. The tension of this spring may be varied by adjusting the plug 48 in the neck 46. The purpose of the spring 54 is to elongate the sleeve 53 and such elongation of the sleeve is limited by a flanged housing 55 which extends through the opening in the wheel and is mounted on the latter by means of an integral gasket-like plate 56. Such plate 56 is interposed between the wheel and the attaching plate 47. A predetermined amount of air pressure within the tire will overcome the action of the spring 54 and thereby maintain the contact 49 in spaced relation from the contact 48. However, when the tire loses air pressure below a predetermined amount, the spring expands thus moving the contact 49 into engagement with the contact 48 to complete the electric circuit of the alarm.

Referring to another modified form of the invention as shown in Fig. 6, it is generally similar to the construction shown in Fig. 4 except that the attaching plate 57 thereof has the stop sleeve 58 formed integrally therewith. This stop sleeve 58 will limit the expansion of the bellows type sleeve 60 in one direction and in this form of the invention, the sleeve 60 is flanged at its open end, as shown at 61, to engage with an internal flange 62 of the neck 63 on which the closure cap 64 is mounted. The flanges 61 and 62 co-act in anchoring the bellows type sleeve in its mounting. The contact supporting plug 65 carries an insulating member 66 in which is threaded a contact 67. Such contact 67 extends into the chamber within the bellows type sleeve and under normal operating conditions, the extreme end thereof is spaced from the contact 68. Such contact 68 is secured to the closed end of the sleeve 60 in axial alignment with the contact 67. The conductor 20 is connected to the contact 67 and in this instance extends through an opening provided in the cap 64. An expansible coil spring 69 is interposed between the closed end of the sleeve and the plug 65. The operation of this form of the present invention is similar to the operation of the forms shown in Figs. 1 and 4.

Referring to Fig. 5 in which another modified form of the present invention is illustrated, the attaching plate is indicated at 70 and a bellows type sleeve 71 is connected to the neck 72 of the plate 70 in a manner similar to the connection of the neck 60 to the neck 63. The contact supporting plug which is threaded in the neck is indicated by the character 73 and carries a flanged insulating sleeve 74 through which a movable contact 74' extends, the head of which is indicated at 75.

The contact 74' is threaded into the tapped socket of block-like member 76 which is secured to the closed end of sleeve 71. A contact 77 is mounted on the sleeve 74 and is adapted to be engaged by the head 75 on movement of the contact 74' in one direction, or when the air pressure in the tire falls below a predetermined amount so that the bellows 71 expands. A conductor 20 is suitably secured to the contact 77. Another contact 78 is mounted in the cap 79 which is threaded onto the neck 72. Such contact 78 is insulated from the cap by an insulating sleeve 80 and the inner end of such contact projects inwardly to a position normally spaced from the contact head 75. When the tire is over inflated, the bellows will contract and the head 75 will engage the contact 78.

A conductor 81 is connected to the contact 78 and to the conductor 20 and has interposed therein a resistance coil 82 so that when the circuit is completed to the signal 85, which in this instance will be in the form of an electric lamp, between contact head 75 engaging the contact 78, a dim illumination of the signal will then be had to indicate over inflation of the tire. However, when the contact head 75 engages the contact 77, the signal 35 will be brilliantly illuminated indicating over inflation of the tire.

Referring to Fig. 9, another modified form of pressure indicating means which is generally indicated at 88 is provided. In this form of the present invention, the indicating means 88 comprises a cylindrical housing 90 having an annularly flanged shoulder 92 formed at one end thereof and being formed with an externally threaded portion 94 intermediate the ends thereof and preferably closely adjacent the flange 92. The housing 90 is adapted to be positioned within the opening 7 which is formed with an annular shoulder 96. Such shoulder 96 is complementary in shape to the flange 92 so that such flange rests thereon with the upper edge of the housing 90 substantially flush with the outer surface of the rim or wheel 6. A removable nut 98 is threadably received over the threaded portion 94 and is adapted to be drawn against the inner surface of the wheel 6 in order to securely mount the housing 90 thereon. A Sylphon or bellows element 101 is disposed within the housing 90 in full floating position with respect thereto and has one end thereof sealed by an end closure member 102 which is secured to the element 101. The opposite end of the Sylphon element 101 is secured to an end cap 104 through the inwardly directed end convolution thereof. Such end cap 104 may be threaded within the tapped inner end of the housing 90. An electrical contact sleeve 106 is formed with an outwardly directed annular flange 108 at one end thereof and an inwardly directed flange 109 at the opposite end thereof. The member 106 is secured to the element 101 through the flange 108 which is clamped between the end member 102 and the end convolution of the member 101.

An adjustable contact member 110 having an integral head 112 and having the inner end of the stem thereof screw threaded, as indicated at 114, is disposed within the member 110 so that the head 112 lies within the chamber of the cup-shaped contact element 106 with the head 112 normally spaced from the flange 109.

A sleeve member 116 extends through an opening in the end cap 104 and is formed with a tapped central opening 118 therethrough which threadably receives the threaded end of the member 110. Such sleeve 116 may be mounted on the end member 104 by a nut 120. The members 116 and 120 are insulated from the member 104 by means of insulation 122.

The rounded wall member 102 is engaged by the inner tube 8; and a contact member 124 is mounted on the inner face thereof in alignment with the head 112, but normally spaced therefrom.

An electrical conductor 126 contacts the projecting end of the member 110 and is connected to an electric circuit with battery 128, a signal 130 and a conductor 132 which may be grounded through the vehicle electric circuit to the rim 6. Thus, when the tire is over inflated, the contact circuit will be completed with the head 112 through contact 124, members 102, 101, 104, 90, and the rim 6. When the tire is under inflated, the contact will be through the flange 109 of member 106 and through the bellows 101, and member 104, housing 90, and rim 6.

Referring to Fig. 10, an annular recess 134 is formed in the outer end of the housing 90 and the Sylphon is so formed that the outermost convolution thereof is adapted to project within such recess. Normally, the bellows is spaced from such recess, but it will be seen that the annular shoulder 136 of such recess serves to act as a stop to limit the contraction of the bellows in the event of over inflation. In this embodiment, the contact 124 is dispensed with and the head 112 of contact element 110 contacts directly against the inside face of the end member 102. The shoulder 136 thus prevents damage to the pressure responsive elements in the event of over inflation.

In Fig. 11, an end closure 138, comparable to the closure 104, is preferably formed of Bakelite, or similar material, and has a neck portion 140 with a tapped opening 142 therethrough for the reception of the threaded end of the member 110. The neck is constructed so as to provide as large a number of threads as possible in the Bakelite closure in order to carry the contact screw 110. A lock nut 144 may be provided over the projecting end of the screw 110 if desired.

In this embodiment of the invention, the innermost convolution 146 of the Sylphon 101 is adapted to bear against the inner face of the closure 138 and is provided with an annular flange 148 adapted to engage the periphery around the inner face of such end member. The circuit is thus grounded to the housing 90 at the annular corner 150 of the bellows.

From the above description, it will thus be seen that in the several embodiments centrifugal action will not affect operation of the device and that such device is readily adaptable to various types of pneumatic wheels.

Referring to Fig. 12, another modified form of applicant's invention is illustrated in which a portion of a wheel is illustrated having a rim 152 of the drop center type. The pneumatic tire 9 and inner tube 8 are mounted on the rim in the usual way having a tire flap 154 positioned therein in accordance with the usual practice. Such drop center rims have wall portions 156 which extend in a generally radial direction from the center of the wheels; and in this embodiment of the invention an aperture 158 is provided through the wall portion 156 in the side of the rim. One of the indicating devices of the present invention, such as that generally indicated at 88, is disposed through the opening 158 so that the inner end, such as 102, is positioned in abutting relationship against the flap 154 or against the tube 8. The operation of the indicator 88 in this embodiment is generally the same as that described above. The position of the indicator through the side wall of the rim has been found to have particular utility when operating at extremely high speeds of 80 miles per hour or more. Tests have shown that with this type mounting centrifugal action at extremely high speeds does not affect the sensitiveness of the device and tests have proven accuracies within a few ounces of tire pressure at 90 miles per hour with this construction.

Referring to Fig. 13, another embodiment of the present invention is illustrated in which the device such as that generally indicated at 88 is disposed through an aperture 160 formed in the rim. In this embodiment a tire flap 162 is provided between the inner tube 8 and the rim 6 and the indicator is mounted in the tire flap. The housing 90 is formed with an outer annular shoulder 164 which engages tire flap 162 and a nut 166 engages the outer edge of the tire flap 162 and is disposed within the opening 160, so as to contact the rim within the opening so that the switch unit is grounded to the rim. The shoulder 164 is preferably larger than the opening 160 so that the unit will not be blown out through the rim opening. A flexible diaphragm 168 is secured to the end of the housing 90 and forms the end wall thereof which abuts against the tube 8. The end wall 168 may be secured to the housing by means of a spun annular channel member 170 which clamps the end to the housing. A bellows, or Sylphon, 172, which is generally similar to the Sylphon element 101 described above, is disposed within the housing; and an annular collar 173 formed of an insulating material is fixed to the top of the bellows and abuts against the flexible diaphragm 168.

The belows is mounted upon a closure cap 174 which is threaded into the end of the housing 90; and is mounted thereon by means of a screw 176 and nut 178. The bellows, screw, and nut are insulated from the closure 174 by insulation 180.

The opposite end of the housing 90 is provided with an inwardly directed annular flange 182 which is adapted to project beyond the peripheral confines of the last convolution 184 of the bellows 172. The adjacent surface of the convolution 184 is normally spaced from the flange 182; but it will be evident that when the pressure within the tire drops beyond a predetermined amount the bellows expands so that there is contact between the convolution 184 and the annular flange 182. An electrical conduit 186 may be connected to the screw 176 and may be tapped into the signal circuit which is a grounded circuit. The contact of convolution 184 and flange 182 thus completes the circuit and causes actuation of the signal.

In the embodiment above described, it will be seen that the threaded portion of the housing 90, to which the end member 174 is threaded, is of substantial length so that the bellows may be readily adjusted to properly space the convolution 184 from the flange 182.

Referring to Fig. 14, a modified circuit is diagrammatically illustrated which is particularly adaptable to use with dual tire vehicles in which a pair of adjacent tires are mounted at each end of the vehicle axle. It will be understood that one of applicant's indicators, such as that generally indicated at 88, is to be associated with each of the adjacent rims. Each of such indicators is grounded to the electric circuit as indicated at 190. The circuit includes electrical conductors 192 having a suitable audible signal 194 interposed in the line thereof and a visual signal in the form of a light 196. Such circuits also include the usual battery and ground 190. One of the elements 88 is connected to the conduit 192 by a conventional conduit 198 while the other is connected through a resistance 201. Thus, when the tire having the resistance 201 has a pressure drop, the light 196 will be dim; while when the other tire has a pressure drop the light will be bright.

What is claimed is:

1. A pressure responsive switch for rim mounted tires having inner tubes, said switch including a resilient expansible bellows, a supporting member secured to one end of said bellows and closing the same, a closure for the other end of the bellows whereby said bellows, said member and said closure define an entirely closed chamber, said supporting member being adapted to be secured to a tire rim with the bellows projecting through the rim and with said closure engaging the inner tube, a pair of electrical contacts within said closed chamber, one of said contacts being carried by said supporting member and the other by said other end of the bellows, one of said contacts being insulated from the rim and the other being electrically connected thereto, said contacts being adapted to engage on increase in length of said bellows, and means projecting from said closed space and adapted on manipulation to adjust one of said contacts with respect to its support.

2. A pressure responsive switch for rim mounted tires having inner tubes, said switch including a resilient expansible bellows, a supporting member secured to one end of said bellows and closing the same, a closure for the other end of the bellows whereby said bellows, said member and said closure define an entirely closed chamber, said supporting member being adapted to be secured to a tire rim with the bellows projecting through the rim and with said closure engaging the inner tube, a pair of electrical contacts within said closed chamber, one of said contacts being carried by said supporting member and the other by said other end of the bellows, one of said contacts being insulated from the rim and the other being electrically connected thereto, said contacts being adapted to engage on increase in length of said bellows and limit such increase in length, and means projecting from said closed space and adapted on manipulation to adjust one of said contacts with respect to its support.

3. A pressure responsive switch for mounted tires having inner tubes, said switch including a resilient expansible bellows, a supporting member secured to one end of said bellows and closing the same, a closure for the other end of the bellows whereby said bellows, said member and said closure define an entirely closed chamber, said supporting member being adapted to be secured to a tire rim with the bellows projecting through the rim and with said closure engaging the inner tube, a pair of electrical contacts fixed with respect to one end of said bellows, a third contact normally positioned intermediate said pair of contacts and fixed with respect to the other end of said bellows and adapted on expansion of said bellows to engage one of said pair of contacts and limit such expansion and on compression of said bellows to engage the other of said pair of contacts and limit such compression.

4. A pressure responsive switch for a rim mounted tire having an inner tube, said switch including a cylindrical housing adapted to project radially inwardly through an opening in the rim and having a shoulder adjacent its outer end adapted to engage the rim and limit inward movement of the housing, means for securing said housing in position with said shoulder contacting said rim, a closure wall for the inner end of the housing, a bellows within the housing and having one end closed and secured to said closure wall, a closure for the opposite end of the bellows having a portion adapted to project from the outer end of said housing and engage the inner tube of the tire, an electrical contact secured to said opposite end of the bellows and located within the bellows and a second electrical contact adjustably threaded through said closure wall of the housing and into said bellows and adapted to engage said first mentioned contact when the bellows increases in length.

5. A pressure responsive switch for a rim mounted tire having an inner tube, said switch including a cylindrical housing adapted to project radially inwardly through an opening in the rim and having a shoulder adjacent its outer end adapted to engage the rim and limit inward movement of the housing, means for securing said housing in position with said shoulder contacting said rim, a removable closure member for the inner end of the housing, a bellows within the housing and having one end closed and secured to said closure member, a closure for the opposite end of the bellows having a portion adapted to project from the outer end of said housing and engage the inner tube of the tire, an electrical contact secured to said opposite end of the bellows and located within the bellows and a second electrical contact adjustably threaded through said closure member of the housing and into said bellows and adapted to engage said first mentioned contact when the bellows increases in length.

6. In a switch for tire signals, an attaching plate provided with an opening, a neck integral with one face of said plate and aligning with the opening, a shoulder integral with the neck and located in the latter, a bellows type sleeve having one end closed and rounded to engage with an inner tube of a penumatic tire and having the opposite end thereof crimped and engaging the shoulder of said neck, a contact carried by the closed end of said sleeve, a plug secured in the neck, a second contact secured to and insulated from said plug to be engaged and disengaged by the first mentioned contact during the elongating and shortening of said sleeve under the influence of the variance of air pressure in the inner tube, and a closure cap for said neck.

7. In a switch for a tire signal, an attaching plate provided with an opening, a neck integral with one face of said plate and aligning with the opening, a shoulder formed in the neck, a bellows type sleeve having one end closed and rounded to engage with an inner tube of a pneumatic tire and having the opposite end thereof crimped and engaging the shoulder of said neck, a plug threaded in the neck and having an aperture, a contact secured to said plug and insulated therefrom and having an aperture aligning with the aperture of said plug, a cap threaded on said neck, a second contact secured to and insulated from said cap, and a third contact adjustably secured to the rounded end of the sleeve and extending through the aperture of the plug and first named contact and provided with a headed end operable by the action of said sleeve to engage and disengage with the first and second named contacts.

8. In combination, a tire rim having an opening therethrough, a sealed generally cylindrical housing having relatively movable end walls, means for securing one end wall to said rim with said housing projecting through said rim opening and the other end wall in position to be actuated by the inner tube of the tire mounted on said rim, a contact within said housing and carried by said first mentioned end wall and a second contact within said housing and movable with the other end wall into and out of engagement with the first contact upon changes in pressure in said inner tube.

CECIL J. KROW.

CERTIFICATE OF CORRECTION.

Patent No. 2,313,247. March 9, 1943.

CECIL J. KROW.

It is hereby certified that error appears in the printed specification of the above numbered patent requiring correction as follows: Page 4, first column, line 59, for "belows" read --bellows--; page 5, first column, line 3, claim 3, before the word "mounted" insert --rim--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.